United States Patent [19]

Sorlie et al.

[11] 4,043,404
[45] Aug. 23, 1977

[54] TILLAGE APPARATUS HAVING IMPROVED CUTTING AND DRIVE STRUCTURE

[75] Inventors: Donald Thomas Sorlie, Ankeny; David Hoffer Bucher; Gail Russell Sutherland, both of Des Moines, all of Iowa

[73] Assignee: Deere & Company, Moline, Ill.

[21] Appl. No.: 649,279

[22] Filed: Jan. 15, 1976

[51] Int. Cl.² .......................................... A01B 21/02
[52] U.S. Cl. ............................. 172/555; 83/676; 111/85; 172/15; 172/103; 172/120; 172/125
[58] Field of Search ............... 172/15, 103, 120, 125, 172/540, 555, 604; 83/676, 835; 111/85, 84, 87; 56/295, 256

[56] References Cited

U.S. PATENT DOCUMENTS

| | | | |
|---|---|---|---|
| 615,005 | 11/1898 | Walquist | 83/676 |
| 994,707 | 6/1911 | Meissner | 111/84 |
| 2,537,586 | 1/1951 | Huitema | 172/120 X |
| 2,847,924 | 8/1958 | Quick | 172/555 |
| 2,888,994 | 6/1959 | Hoff et al. | 172/103 |
| 3,157,978 | 11/1964 | McMullen | 56/295 |
| 3,395,521 | 8/1968 | Crockett et al. | 56/295 |
| 3,872,930 | 3/1975 | Campbell | 172/15 |

FOREIGN PATENT DOCUMENTS

| | | | |
|---|---|---|---|
| 109,443 | 1/1940 | Australia | 172/555 |
| 35,626 | 1/1966 | Finland | 172/604 |
| 1,190,163 | 4/1965 | Germany | 83/676 |
| 29,236 | 5/1967 | Japan | 83/835 |
| 700,597 | 12/1953 | United Kingdom | 111/85 |
| 883,610 | 12/1961 | United Kingdom | 83/676 |

*Primary Examiner*—Edgar S. Burr
*Assistant Examiner*—Steven A. Bratlie

[57] ABSTRACT

An improved cutting and drive structure is disclosed that is particularly useful in conjunction with tilling apparatus for sod seeding purposes. The structure includes a tillage blade or cutter wheel mounted for rotation by a drive structure that includes a rotatable drive shaft. The cutter wheel has a thin disc-like body portion and a periphery with a plurality of teeth thereon, with different teeth being offset in opposite directions from the plane of the body portion. The offset teeth which in a preferred embodiment have hard-facing on the cutting surface, have a specific configuration to allow the cutting wheel to produce a furrow in ground contacted by the wheel, with the furrow being wider than the body portion of the wheel due to the offset teeth, and this results in reduced soil compaction at the bottom of the furrow, as well as loose dirt therein to provide cover for seed deposited in the furrow. The drive structure includes a friction drive plate for rotating the cutter wheel, with the cutter wheel being fastened to the threaded drive shaft so that the cutter wheel is self-tightening.

6 Claims, 6 Drawing Figures

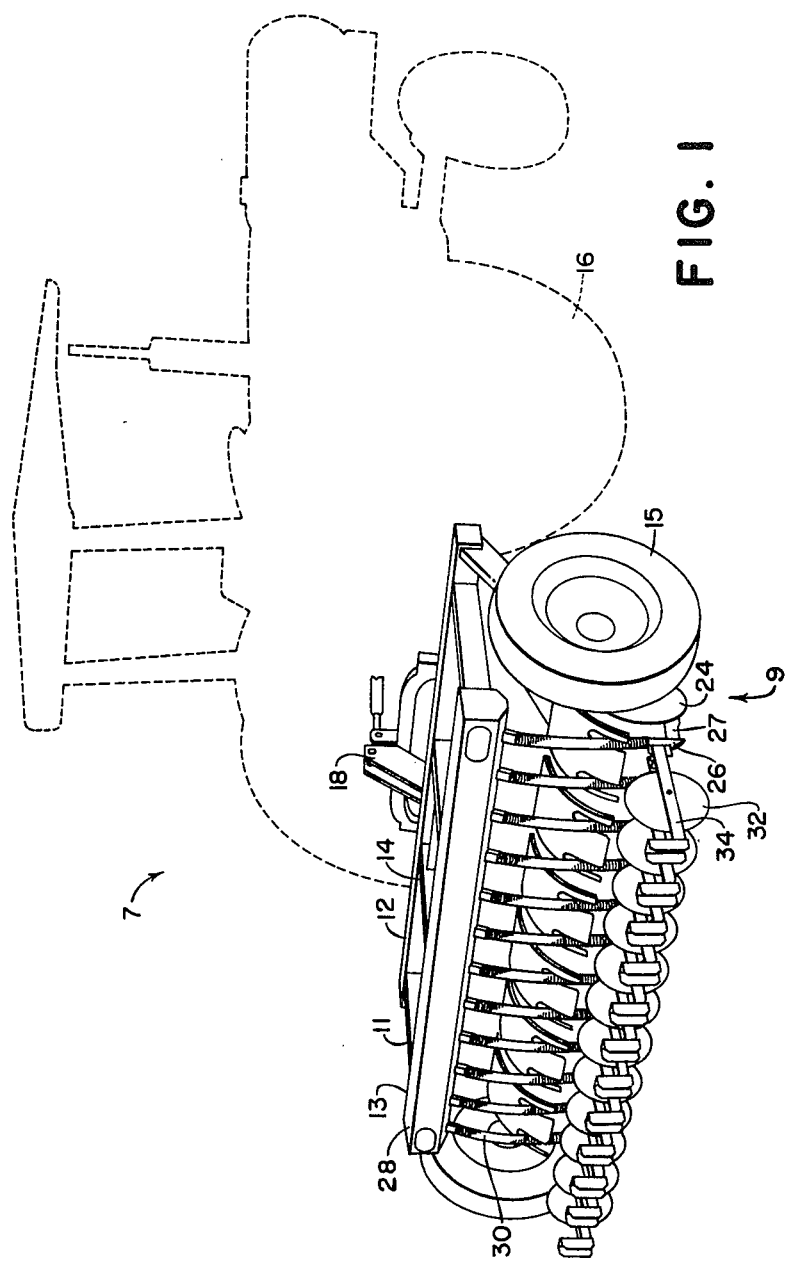

TILLAGE APPARATUS HAVING IMPROVED CUTTING AND DRIVE STRUCTURE

FIELD OF THE INVENTION

This invention relates to a tillage apparatus, and more particularly, relates to tillage apparatus having an improved cutting and drive structure.

BACKGROUND OF THE INVENTION

The use of tillage apparatus is well known, and various types of apparatus have been developed that are useful for one or more tasks.

As such apparatus has been developed and utilized, it has become evident that such apparatus could be improved, particularly for the many different tasks to be accomplished. It has been discovered, for example, that conventional tillage apparatus, such as the disc harrow, disc cultivator and rotating hoes, have not proved to be completely suitable for preparing ground for seeding where legumes are to be grown in established grass sod.

For growing legumes in an established grass sod, the ground surface is often uneven or rocky and may have grass swards of differing thicknesses thereon. To prepared such ground for seeding or grassland renovation, it is desirable that the number of trips that an implement must make over such ground be held to a minimum in order to accomplish such tasks as tilling, seeding, cultipacking, and spraying of herbicides. Hence, an implement capable of performing all of the necessary tasks in successive steps during a signal pass over the ground was needed.

Responding to this need, apparatus has heretofore been developed having a capability for opening a furrow, depositing seed in the furrow, packing the seed, and spraying chemicals on the planting area. Examples of such apparatus for carrying out some or all of these various tasks can be found, for example, in U.S. Pat. Nos. 2,685,243; 2,734,439; 3,491,709; 3,566,813; 3,568,613; 3,604,515; 3,611,956; 3,673,970; 3,701,327; 3,749,035; and 3,866,552.

Cutting of the sward and sod mat and provision of a furrow therein has, however, proved to be a continuing problem, at least in some instances, including problems of forming and/or controlling the width of a furrow to be cut.

When the apparatus is towed, as is preferred, the engine of a tractor is commonly utilized for power, as shown for example, in the patent to Kaller, U.S. Pat. No. 2,957,529. This allows the tillage apparatus to disconnect from the tractor in order to release the tractor for other uses.

In any event, considerable power has heretofore been required to cut the furrow, particularly where a plurality of furrows are simultaneously cut, as is conventional, and hence improvements in the cutting wheel are desirable.

In addition, cutter wheel drive has also been a problem, at least in some instances, and improvement in such a drive, as well as in the cutter wheel mounting, is also desirable.

SUMMARY OF THE INVENTION

This invention provides an improved cutting and drive structure that includes an improved cutter wheel and associated structure for mounting and driving the cutter wheel.

As a part of the improved structure, the cutting wheel has a plurality of teeth thereon different ones of which are offset in opposite axial directions from the plane of the thin disc-like wheel body to improve the quality of the cut furrow. In addition, in the preferred embodiment, the cutting edge of each tooth has a slight notch therein and is hard-faced. The cutting wheel has friction drive, with the wheel mounted so as to be self-tightening.

It is therefore an object of this invention to provide an improved cutting and drive structure.

It is another object of this invention to provide an improved cutting and drive structure for a tillage apparatus for sod seeding purposes.

It is yet another object of this invention to provide an improved cutting and drive structure having an improved cutter wheel.

It is yet another object of this invention to provide an improved cutting and drive structure having an improved structure for mounting of the cutter wheel.

It is still another object of this invention to provide an improved cutting and drive structure having an improved structure for cutting a furrow.

It is still another object of this invention to provide an improved cutting and drive structure having a cutting wheel with a thin disc-like body the periphery of which has teeth thereon different ones of which are offset in opposite axial directions from the plane of the disc-like body.

It is yet another object of this invention to provide an improved cutting and drive structure that includes a friction drive for the cutting wheel that is also self-tightening.

With these and other objects in view, which will become apparent to one skilled in the art as the description proceeds, this invention resides in the novel construction, combination and arrangement of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate complete examples of the invention according to the best mode so far devised by the practical application of the principle thereof, and in which:

FIG. 1 is a perspective view of the tillage apparatus having the improved cutting and drive structure of this invention thereon;

DESCRIPTION OF THE INVENTION

Figure 3:
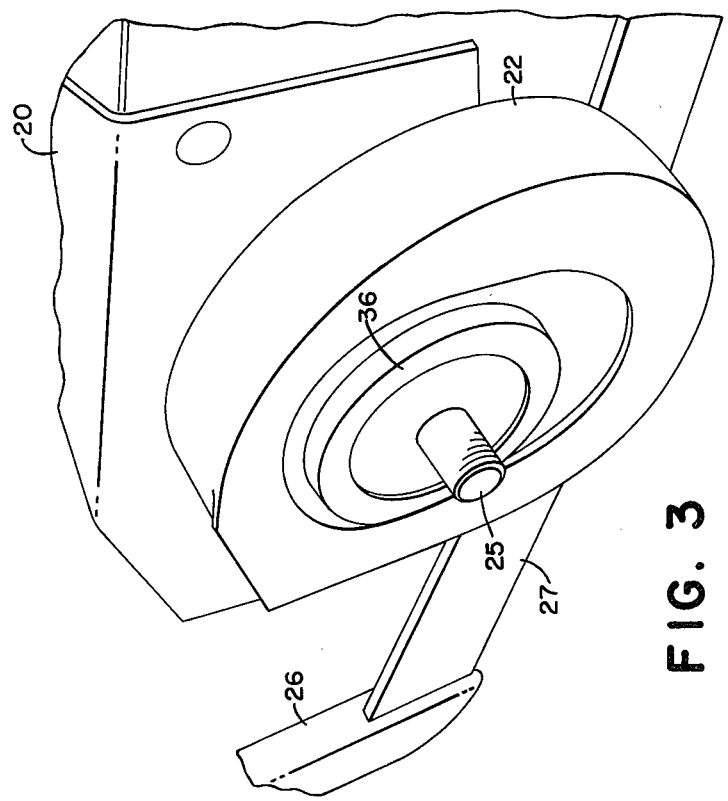
FIG. 3 is a perspective view of the drive structure for a cutter wheel showing the friction drive and threaded drive shaft upon which cutter wheel is mounted.

Referring now to the drawings, FIG. 1 shows a tillage apparatus 7 that includes the improved cutting and drive structure 9 of this invention. As shown, apparatus 7 conventionally includes a tool bar or frame means 11 with elongated members 12 and 13 having cross braces 14 in suitable locations. Gauge wheels 15 may also be provided, the gauge wheels being mounted on the frame means. A tractor 16 is provided to tow the apparatus (or, alternately, it could be self-propelled, if desired) and power for the tractor is coupled to the apparatus, in conventional manner, as, for example, through shafts connected through universal joints between the power take-off of the tractor and a gear box mounted on the tool box. When towed, the apparatus is conventionally attached to the tractor as by a conventional three-point hitch 18 as indicated in FIG. 1.

Figure 2:
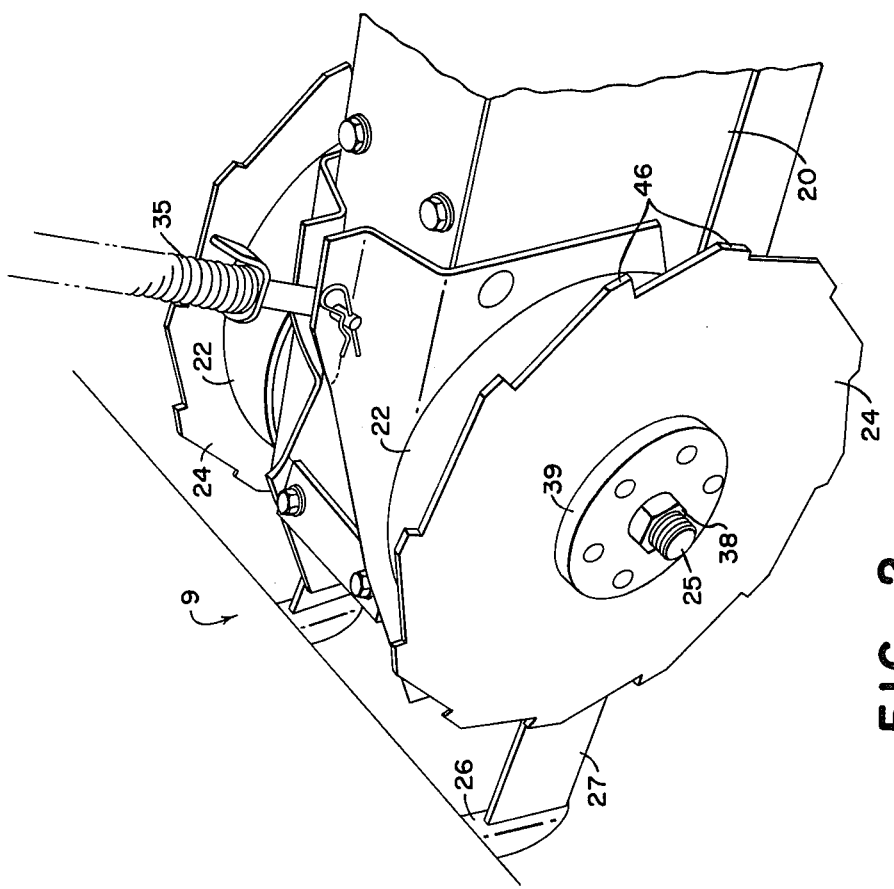
FIG. 2 is a perspective view of a portion of the tillage apparatus shown in FIG. 1 to illustrate the cutter wheel on a mounting unit.

As also indicated in FIG. 2, the frame means supports a plurality of pivoted arms 20 each of which is connected to one or more depth defining skids 22. One or more cutter wheels 24 are mounted on a drive shaft 25 associated with each skid 22, and a seed boot 26 may be mounted on each skid adjacent to and rearwardly of each cutter wheel 24 by a seed tube mounting assembly 27. Seed boots 26 are connected to a seed hopper 28 through tubing 30 and conventionally have a seed metering unit (not shown) connected therewith. As shown in FIG. 1, a packer wheel 32 may be mounted rearwardly of skid 22 by means of a bracket 34 so that the packer wheel follows the furrow cut by the cutter wheel and packs seed therein. Each cutter wheel arm 20 is preferably biased downwardly, as by spring 35, toward ground contact during movement of the apparatus by the tractor (when towed).

The foregoing structure has not been discussed in detail, since it is utilized merely to orient the cutter wheel of this invention with respect to a tillage apparatus, the discussion thereof providing a basis for the explanation of the improvement of this invention. The overall combination of a cutter, seed tube and packer is shown, for example, in U.S. Pat. Nos. 3,611,956; 3,749,035 and 3,866,552, which patents may be referred to for a more complete general description.

As shown in FIG. 3, a friction disc 36 is preferably provided on drive shaft 25. Disc 36 is constrained to rotation with drive shaft 25 (which is conventionally rotated by drive supplied through the tillage apparatus from the towing tractor). As is also shown, the end of drive shaft 25 is threaded, and each cutter wheel 24 has a central aperture 37, with the drive shaft 25 being received therein so that the inner face of the cutter wheel engages the friction disc. A nut 38 is then threaded onto the end of the drive shaft and in tightened against hub 39 on the outer face of the cutter wheel, and this holds the cutter wheel against the friction disc. The shaft is threaded with threads of opposite direction at each side with respect to the direction of rotation of each respective cutter wheel, so that each nut tends to tighten against the cutter wheel when the cutter wheel is rotated; hence, each cutting wheel is self-tightening.

Figure 4:
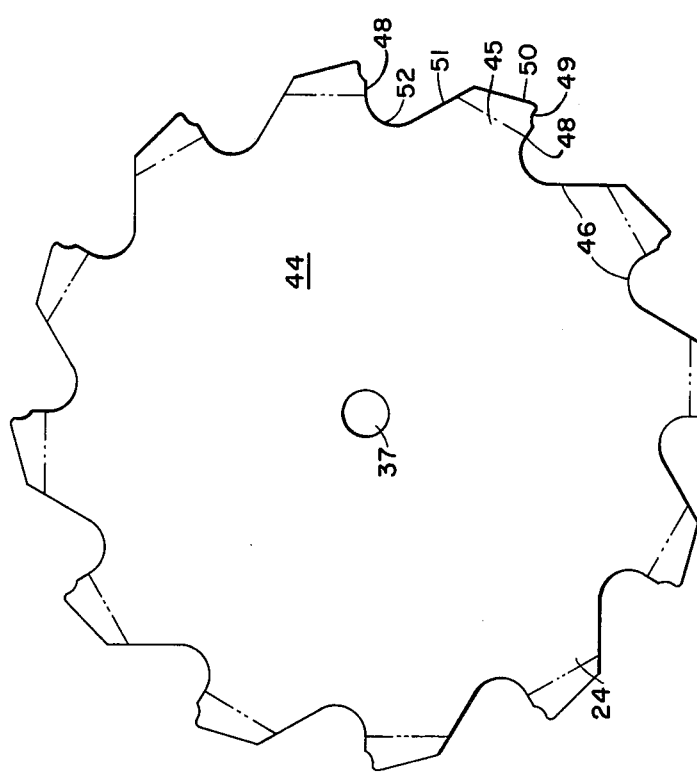
FIG. 4 is a side elevation view of the preferred embodiment of the cutter wheel of this invention.
Figure 5:
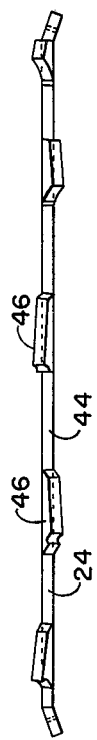
FIG. 5 is an end view of the cutter wheel as shown in FIG. 3.

As shown in FIGS. 4 and 5, cutter wheel 24 has a thin disc-like body portion 44 and a periphery 45 that includes a plurality of spaced cutting teeth 46. The teeth 46 are angularly spaced at least 15° apart and preferably each spaced about thirty degrees around the periphery of the disc (i.e., there are thus twelve teeth spaced about the periphery of the cutter wheel), and each tooth has a cutting edge 48 that falls substantially along a line that passes through the center axis of the disc body.

In the preferred embodiment, as shown in FIG. 4, each cutting edge of each tooth has a relief for hard-facing and, as shown, the cutting edge of each tooth has a notch or recess 49 near the outer end and is rounded at the outer edge. Hard-facing, preferably a tungsten carbide material such as Stellite, is applied to the cutting edge of each tooth for durability. The periphery has a portion 50 that is slanted slightly inwardly from the top of the tooth toward the next adjacent tooth, after which the periphery has a portion 51 that is turned inwardly at about a 45° angle from the slight recess of portion 50 to form a rounded notch 52 at the bottom of the next adjacent tooth.

In addition, as shown in FIG. 5, each tooth is offset from the plane of the disc-like body portion, i.e., the teeth project and diverge outwardly away from the plane formed by the opposite faces of the disc-like body. Thus, each tooth is offset in the axial direction (of the center axis of the disc body) opposite to that of the immediately adjacent tooth so that as shown in FIG. 5, the teeth are successively offset in first one axial direction and then in the other.

The offset teeth result in a cut furrow that is substantially equal to the maximum displacement of the teeth in both directions. In an operating embodiment, sheet steel of 0.187 inch width and 12 inch diameter was successfully utilized, with the teeth being offset sufficient to provide a furrow of 0.5 inches width. The cutter wheel with offset teeth has been found to be advantageous, and the power requirements were found to be reduced in cutting the furrow, soil compaction was reduced in the bottom of the cut furrow, the cutter wheel with offset teeth has been found to be more economical to produce than at least some other types, and more loose dirt is provided in the bottom of the cut furrow to provide a better cover for seed.

Figure 6:
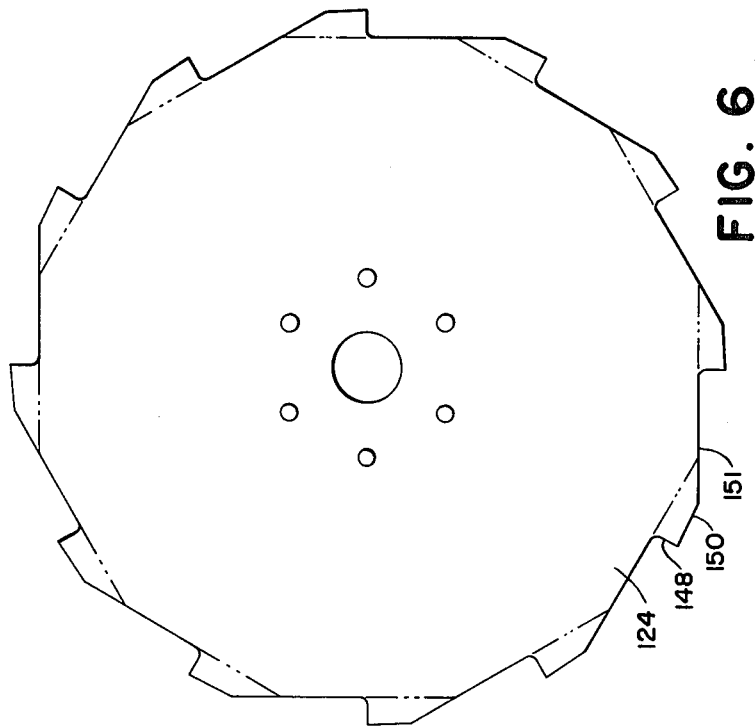
FIG. 6 is a side elevation view of an alternate embodiment of the cutter wheel of this invention.

An alternate embodiment of the cutter wheel is shown in FIG. 6. As shown, cutter wheels 124 qre similar to cutter wheels 24, except that the cutting edge 148 is substantially straight and terminates at a right angle at the outer edge, with portion 150 being slightly slanted inwardly to join portion 151 that forms a right angle at the bottom of the next adjacent tooth. In the alternate embodiment, the teeth are offset in the same manner as in the preferred embodiment.

In operation, the apparatus, when towed by a tractor and moved in a normal operating direction, will have the cutter wheels driven by the tractor to rotate as sufficiently high speed to perform the cutting operation (preferably the cutter wheels rotate at a speed of about 730 rpm and are rotated in the direction of travel of the apparatus) and in ground contact to cut a furrow therein. The furrow cut by the cutter wheel is narrow and is preferably about ½ inch in width and has a selected depth of between ¾ inches and 2¼ inches. The following packer wheel has a width narrower than that of the furrow and is preferably about ¼ inch in width. Thus, the cutter wheels cut narrow furrows into the ground (the number of furrows depending upon the number of cutter wheels utilized) without disturbing the remaining sod, and seed can thereafter be immediately deposited in the cut furrow, with the seed then being immediately packed at the bottom of the furrow by the packer wheel.

As can be seen from the foregoing, this invention provides an improved tillage apparatus that includes an improved cutting wheel and drive structure. Hence, the invention is not to be considered as being limited to the particular details given, nor to the specific application to which reference has been made during the description of the apparatus, except insofar as may be required by the scope of the appended claims.

What is claimed is:

1. In a tillage apparatus, a cutter wheel for cutting a trench in soil comprising:
   a thin flat disc having a periphery and a body, the opposite faces of which define closely spaced parallel planes; and
   a plurality of teeth at the periphery of and integral with said disc and having alternate teeth offset in opposite axial directions with respect to the disc body, said teeth extending outwardly at the periphery of said disc and angularly spaced at least 15° apart, said teeth having radially extending leading cutting edges movable in a circular path, and inwardly extending rear edges, each of the latter being composed of a first portion that joins in a trailing relationship with and beginning at the respective cutting edge and is inclined inwardly for the entirety of its extent with respect to the aforesaid circular path, a second inclined portion that continues inwardly at a larger angle from said first portion, and an arcuate portion that joins said second portion and the cutting edge of an adjacent tooth.

2. The cutter wheel of claim 1, wherein said offset teeth form a furrow substantially equal to the total width of offset of said teeth in both axial directions, with said formed furrow having reduced soil compaction at the bottom with loose dirt therein.

3. The cutter wheel of claim 1, wherein said cutting edges of said teeth have a recessed portion and wherein said cutting edges have hard-facing thereon.

4. The cutter wheel of claim 1, wherein the angle between said first and second portions is substantially 45°.

5. The cutter wheel of claim 1, wherein said second portion that extends inwardly from the first portion forms a substantially right angle with the bottom of the next adjacent tooth of said cutter wheel.

6. The cutter wheel of claim 1, wherein said teeth are spaced about the periphery of said cutter wheel with a spacing of substantially 30° between adjacent teeth.

* * * * *